United States Patent
Lee

(10) Patent No.: US 10,892,993 B2
(45) Date of Patent: Jan. 12, 2021

(54) QOS INFORMATION CONTROL METHOD AND APPARATUS

(71) Applicant: Samsung Electronics Co., Ltd., Suwon-si (KR)

(72) Inventor: Ok-seon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 15/978,524

(22) Filed: May 14, 2018

(65) Prior Publication Data

US 2018/0331958 A1   Nov. 15, 2018

(30) Foreign Application Priority Data

May 15, 2017 (KR) .................. 10-2017-0059951

(51) Int. Cl.
| | | |
|---|---|---|
| *H04L 12/851* | (2013.01) | |
| *H04W 72/08* | (2009.01) | |
| *H04W 28/24* | (2009.01) | |
| *H04W 88/02* | (2009.01) | |

(52) U.S. Cl.
CPC ............. *H04L 47/24* (2013.01); *H04W 28/24* (2013.01); *H04W 72/08* (2013.01); *H04W 88/02* (2013.01)

(58) Field of Classification Search
None
See application file for complete search history.

(56) References Cited

U.S. PATENT DOCUMENTS

| 8,531,982 B1 | 9/2013 | Lee et al. | |
|---|---|---|---|
| 9,392,306 B2 | 7/2016 | Kotecha et al. | |
| 2009/0017836 A1* | 1/2009 | Lee ................... | H04W 72/1236 455/452.2 |
| 2010/0290361 A1* | 11/2010 | Kim ....................... | H04L 47/24 370/252 |
| 2014/0140213 A1 | 5/2014 | Raleigh et al. | |

(Continued)

FOREIGN PATENT DOCUMENTS

WO   2014/098409 A1   6/2014

OTHER PUBLICATIONS

ZTE, 'Discussion on QoS aspects for feD2D', R2-1703071, 3GPP TSG-RAN WG2 Meeting #97bis, Spokane, USA.

(Continued)

*Primary Examiner* — Hassan A Phillips
*Assistant Examiner* — Gautam Sharma
(74) *Attorney, Agent, or Firm* — Jefferson IP Law, LLP

(57) ABSTRACT

A method of a terminal for controlling quality of service (QoS) information is provided. The method includes acquiring a data packet, identifying a traffic type of the data packet, when QoS control is required for a service flow according to the traffic type, transmitting, to a network device, an uplink (UL) data packet, first QoS support information of the terminal, and a QoS support or non-support display request of the network device, receiving a downlink (DL) data packet from a service providing server, determining whether the DL data packet corresponds to the UL data packet and includes second QoS support information of at least one network device connecting the terminal and the service providing server, and identifying the second QoS support information based on a result of the determining.

17 Claims, 13 Drawing Sheets

(56) References Cited

U.S. PATENT DOCUMENTS

| | | | |
|---|---|---|---|
| 2014/0196113 A1 | 7/2014 | Chen et al. | |
| 2015/0003242 A1 | 1/2015 | Han et al. | |
| 2016/0359750 A1* | 12/2016 | Miklos | H04L 47/24 |
| 2017/0347307 A1* | 11/2017 | Mehta | H04L 12/4633 |
| 2019/0109823 A1* | 4/2019 | Qiao | H04L 12/1407 |
| 2019/0124012 A1* | 4/2019 | Hong | H04W 72/08 |

OTHER PUBLICATIONS

International Search Report dated Aug. 20, 2018, issued in International Patent Application No. PCT/KR2018/005522.
European Search Report dated Jan. 21, 2020; European Appl. No. 18801794.1-1215 / 3586541 PCT/KR2018005522.

* cited by examiner

QOS INFORMATION CONTROL METHOD AND APPARATUS

CROSS-REFERENCE TO RELATED APPLICATION(S)

This application is based on and claims priority under 35 U.S.C. § 119(a) of a Korean patent application number 10-2017-0059951, filed on May 15, 2017, in the Korean Intellectual Property Office, the disclosure of which is incorporated by reference herein in its entirety.

BACKGROUND

1. Field

The disclosure relates to a method of controlling quality of service (QoS) information and an apparatus for controlling QoS information.

2. Description of Related Art

In a long-term evolution (LTE) cellular system, a traffic type is extracted from a network based on information provided by an over the top (OTT) service server, and a quality of service (QoS) policy suitable for the traffic is determined. When the QoS policy is determined based on the information provided by the OTT service server, it is difficult to preset a QoS application rule to a traffic type provided from the OTT service server, and it is difficult to determine the QoS policy when the OTT service server does not provide the information. In addition, when the OTT service server is changed, it is necessary to detect the changed OTT service server, and thus it may be difficult to promptly determine the QoS policy.

Therefore, there is a need to develop QoS policy determination in addition to the QoS policy determination based on the information provided by the OTT service server.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a quality of service (QoS) information control method and apparatus capable of easily identifying QoS support information of network devices by transmitting QoS support information together when a data packet is transmitted by a terminal or a network device for supporting QoS control, and a recording medium having recorded thereon a program capable of performing the method.

Additional aspects will be set forth in part in the description which follows and, in part, will be apparent from the description, or may be learned by practice of the presented embodiments.

In accordance with an aspect of the disclosure, a QoS control method is provided. The QoS control method includes sharing QoS support information between a terminal and a network device. A plurality of network devices such as a first network device and a second network device may be included on a data transmission path, but the plurality of network devices will be simply described as an access network device and a core network device. This is not intended to limit the scope of the disclosure, including the operations of the plurality of network devices.

In accordance with another aspect of the disclosure, a method by which a terminal controls QoS information is provided. The method includes acquiring a data packet, identifying a traffic type of the data packet, when QoS control is required for a service flow according to the traffic type, transmitting, to a network device, an uplink (UL) data packet, first QoS support information of the terminal, and a QoS support or non-support display request of the network device, receiving a downlink (DL) data packet from a service providing server, determining whether the DL data packet corresponds to the UL data packet and includes second QoS support information of at least one network device connecting the terminal and the service providing server, and identifying the second QoS support information based on a result of the determination.

The identifying of the data packet may include determining whether a QoS support policy of the at least one network device is based on packet filtering or based on a QoS marking.

The method may further include, when the QoS support policy is based on the QoS marking and the at least one network device is included in a transmission path of the data packet, applying the QoS marking to at least one other UL data packet and transmitting the at least one other UL data packet, wherein the at least one other UL data packet is transmitted in a subsequent order after the UL data packet, and when the QoS support policy is based on the QoS marking and the at least one network device is not included in the transmission path, transmitting only the at least one other UL data packet and the first QoS support information.

The first QoS support information and the second QoS support information each include information about a traffic type of the UL data packet and a QoS support policy.

The method may further include, when the second QoS support information is not included in the DL data packet, transmitting, to the network device, only at least one other UL data packet and the first QoS support information, wherein the at least one other UL data packet is transmitted in a subsequent order after the UL data packet.

In accordance with another aspect of the disclosure, a method by which a first network device controls QoS information is provided. The method includes when the first network device in a transmission path of a data packet receives a QoS support or non-support display request and an UL data packet, transmitting the UL data packet and first QoS support information to a second network device, when the first network device receives a DL data packet of the second network device, determining whether the DL data packet corresponds to the UL data packet and includes second QoS support information of the second network device, determining a first QoS support policy of the first network device based on a result of the determination, and transmitting, to a terminal, the DL data packet and QoS support information of at least one network device in the transmission path based on the first QoS support policy.

The method may further include when the QoS support or non-support display request is received, installing a packet filtering module for QoS support, and determining, using the packet filtering module, whether the DL data packet corresponds to the UL data packet based on the identification information of the data packet.

The method may further include determining whether the first QoS support policy is based on a QoS marking from QoS support information of all network devices in the transmission path, and when the first QoS support policy is based on the QoS marking, removing the packet filtering module.

The determining when the first QoS support policy is based on the QoS marking, removing the packet filtering module may include identifying a second QoS support policy of the second network device based on the second QoS support information of the second network device in the transmission path, and changing the first QoS support policy of the first network device to correspond to the second QoS support policy.

The transmitting of the DL data packet to the terminal may include, when QoS support information of network devices other than the first network device in the transmission path is not included in the DL data packet, transmitting the first QoS support information and the DL data packet to the terminal.

The method may further include, when the first QoS support policy is based on packet filtering, transmitting only another data packet in a subsequent order of the UL data packet or the DL data packet without the first QoS support information.

The method may further include, when the terminal does not perform QoS control, transmitting only another DL data packet in a subsequent order of the DL data packet without the first QoS support information.

In accordance with another aspect of the disclosure, a terminal for controlling QoS information is provided. The terminal includes a transceiver, a processor configured to acquiring a data packet, identify a traffic type of the UL data packet, when QoS control is required for a service flow according to the traffic type, control the transceiver to transmit, to a network device, an UL data packet, first QoS support information of the terminal, and a QoS support or non-support display request of the network device, control the transceiver to receive a DL data packet from a service providing server, determine whether the data packet corresponds to the UL data packet and includes second QoS support device of at least one network device connecting the terminal and the service providing server, and identify second QoS support information of the at least one network device.

In accordance with another aspect of the disclosure, a first network device for controlling QoS information is provided. The first network device includes transceiver, a processor configured to, when the first network device in a transmission path of a data packet receives a QoS support or non-support display request and an UL data packet, control the transceiver to transmit the UL data packet and first QoS support information to a second network device, when a DL data packet of the second network device is received, determine whether the DL data packet corresponds to the UL data packet and includes second QoS support information of the second network device, determine a first QoS support policy of the first network device based on a result of the determination, control the transceiver to transmit, to a terminal, the DL data packet and QoS support information of at least one network device in the transmission path based on the first QoS support policy, and a memory configured to store information about the UL data packet.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
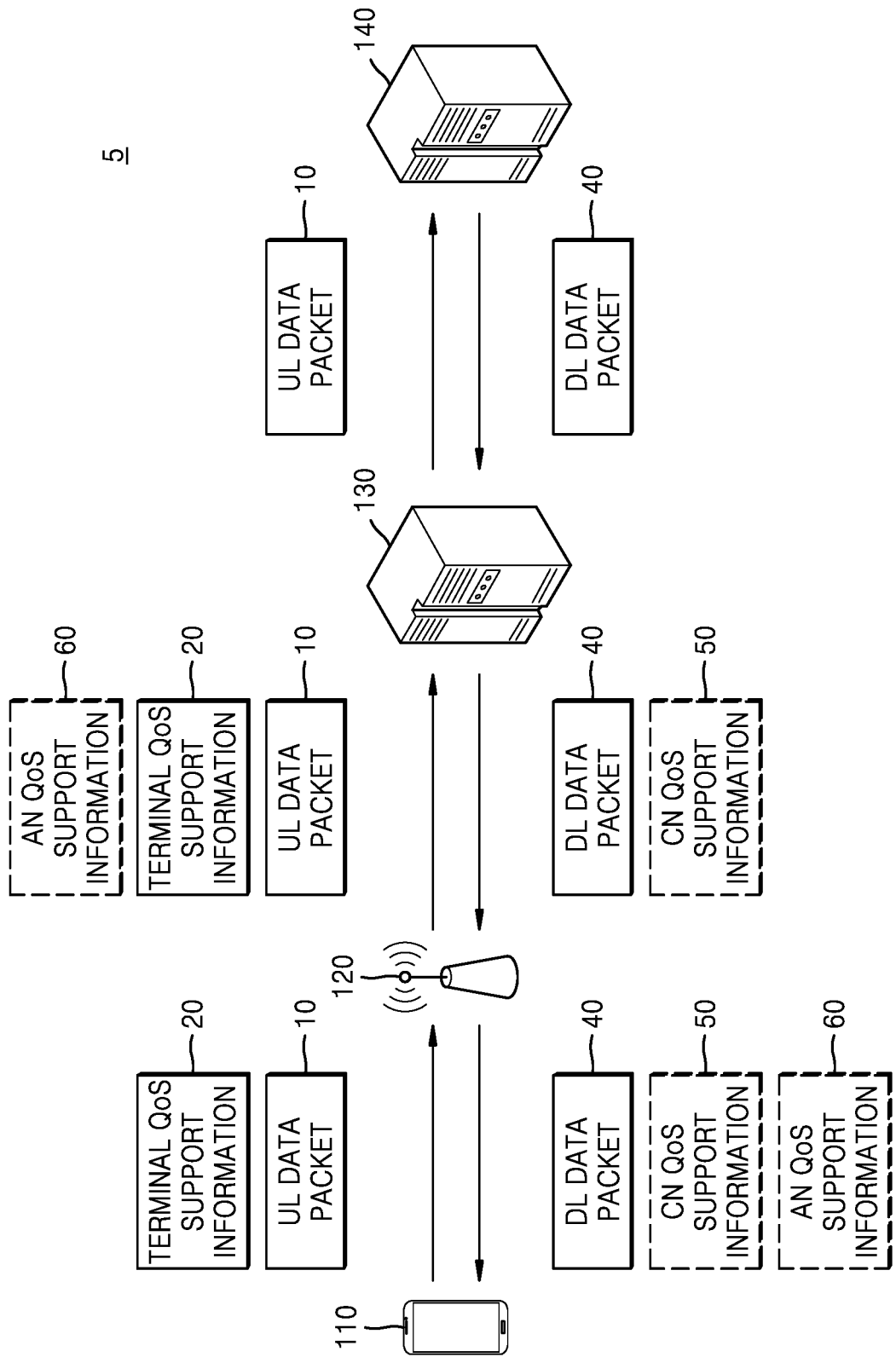
FIG. 1 is a diagram of a quality of service (QoS) information control system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein are those general terms currently widely used in the art in consideration of functions in regard to the disclosure, but the terms may vary according to the intention of those of ordinary skill in the art, precedents, or new technology in the art. In addition, specified terms may be selected by the applicant, and in this case, the detailed meaning thereof will be described in the detailed description of the disclosure. Thus, the terms used herein should be understood not as simple names but based on the meaning of the terms and the overall description of the disclosure.

It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

The embodiments will be described with reference to the accompanying drawings in such a manner that the embodiments may be easily carried out by a person of ordinary skill in the art. However, the disclosure may be implemented in various forms and is not limited to the embodiments. In addition, descriptions of well-known functions and constructions will be omitted for clarity and conciseness, and similar reference numerals are assigned to similar elements throughout the disclosure.

A core network (CN) device used herein may refer to mobile management entity (MME), a general packet radio service (GPRS) serving GPRS support node (SGSN), mobile switching center (MSC), access control router (ACR), operations & maintenance (OAM), a gateway (GW), or the like. An access network (AN) device may refer to a device included in a base station such as evolved universal terrestrial radio access network (E-UTRAN) NodeB (eNB) A terminal may refer to a notebook computer including customer premises equipment (CPE), a portable user device such as a smartphone or a multimedia device, a non-portable user device such as personal computer (PC) including a CPE, a notebook, a tablet PC, or the like.

FIG. 1 is a diagram of a quality of service (QoS) information control system according to an embodiment of the disclosure.

Referring to FIG. 1, a QoS information control system 5 may include at least one terminal 110, at least one AN device 120, a CN device 130, and a service providing server 140. However, this is merely an example, and the QoS information control system 5 may further include another network device for connecting at least one terminal 110 and the service providing server 140. The service providing server 140 may refer to a server that provides a video streaming service, a social network service (SNS) service, a call service, a messenger service, or the like, but this is merely an example. The service provided by the service providing server 140 is not limited to the above-described example.

Hereinafter, for convenience, it is assumed that the terminal 110, the AN device 120, the CN device 130, and the service providing server 140 are included in the QoS information control system 5. The AN device 120 and the CN device 130 are merely an example of network devices existing on a service path between the terminal 110 and the service providing server 140, and a QoS information control method according to an embodiment is not limited and applied to the above-described network devices.

The terminal 110 may acquire at least one data packet by using the service provided by the service providing server 140. In one example, when the terminal 110 is a CPE, the terminal 110 may receive at least one data packet from the user device. In another example, when the terminal 110 is a user device on which a CPE device is mounted, the terminal 110 may generate the at least one data packet.

In addition, when the terminal 110 uses the service provided by the service providing server 140, the terminal 110 may perform QoS control to control traffic due to the transmitted and received data packet. The QoS control refers to the control of data transmission by determining the priorities of application programs, user devices, data flow, and the like to secure specific level of performance to data transmission.

The terminal 110 may use a QoS support policy based on QoS marking or packet filtering for controlling QoS. In the case of the QoS support policy based on QoS marking, QoS support information including information about a traffic type of the data packet and a path intended to perform the QoS control may be disposed in a header of the data packet. In addition, the QoS support policy based on packet filtering may be performed by using separate QoS support information. For example, in the case of the QoS support policy based the packet filtering, various address information (e.g., a source internet protocol (IP) address, a destination IP address, a source port number, a destination port number, a protocol type, and the like) may be provided as the QoS support information to specify that the data packet is subject to QoS support.

Even though the QoS control is performed in the terminal 110, it may be unnecessary to continuously transmit the QoS support information when the QoS control is not performed in the AN device 120 and the CN device 130, which connect the service providing server 140 and the terminal 110. Therefore, the terminal 110 may need to determine the QoS control or non-control of the AN device 120 and the CN device 130 and the type of the QoS support policy to prevent the continuous transmission of the QoS support information. In addition, to determine whether to perform the QoS control in the network device capable of performing the QoS control, it is necessary to check whether QoS control is supported by another network device that connects the terminal 110 and the service providing server 140.

To perform efficient QoS control, the QoS information control system 5 may provide the QoS support information of any device in the QoS information control system 5 to the terminal 110, the AN device 120, the CN device 130, and the like. The QoS support information may include information about the traffic type of the data packet, the QoS support policy, and QoS support or non-support indication request.

For example, when the terminal 110 supports the QoS control, the terminal 110 may transmit QoS support information 20 of the terminal to the AN device 120 together with the data packet (hereinafter, referred to as uplink (UL) data packet 10), which is being transmitted to the service providing server 140. In addition, when the AN device 120 performs the QoS control and when the UL data packet 10 and the QoS support information 20 of the terminal are received from the terminal 110, the UL data packet 10, the QoS support information 20 of the terminal, and QoS support information 60 of the AN device may be transmitted to the CN device 130.

When the CN device 130 performs the QoS control, the CN device 130 may detect the UL data packet 10 from the packet received from the AN device 120, and transmit the UL data packet 10 to the service providing server 140.

Meanwhile, when a downlink (DL) data packet 40 corresponding to the UL data packet 10 is received from the service providing server 140, the CN device 130 may transmit the DL data packet 40 and the QoS support information 50 of the CN device 130 to the AN device 120. In addition, the AN device 120 may transmit, to the terminal 110, the packet and the QoS support information 60 of the AN device 120, which are received from the CN device 130.

The terminal 110, the AN device 120, and the CN device 130 may identify the QoS control or non-control and the QoS support policy of another device, based on the received QoS support information of another device.

However, it will be presumed that the terminal 110, the AN device 120, and the CN device 130 each perform the QoS control. In the case of the network that does not perform the QoS control, the received packet may be transmitted to another network device without QoS support information.

Hereinafter, QoS information control methods according to various embodiments will be described according to whether the terminal 110, the AN device 120, and the CN device 130 support the QoS control.

Figure 2:
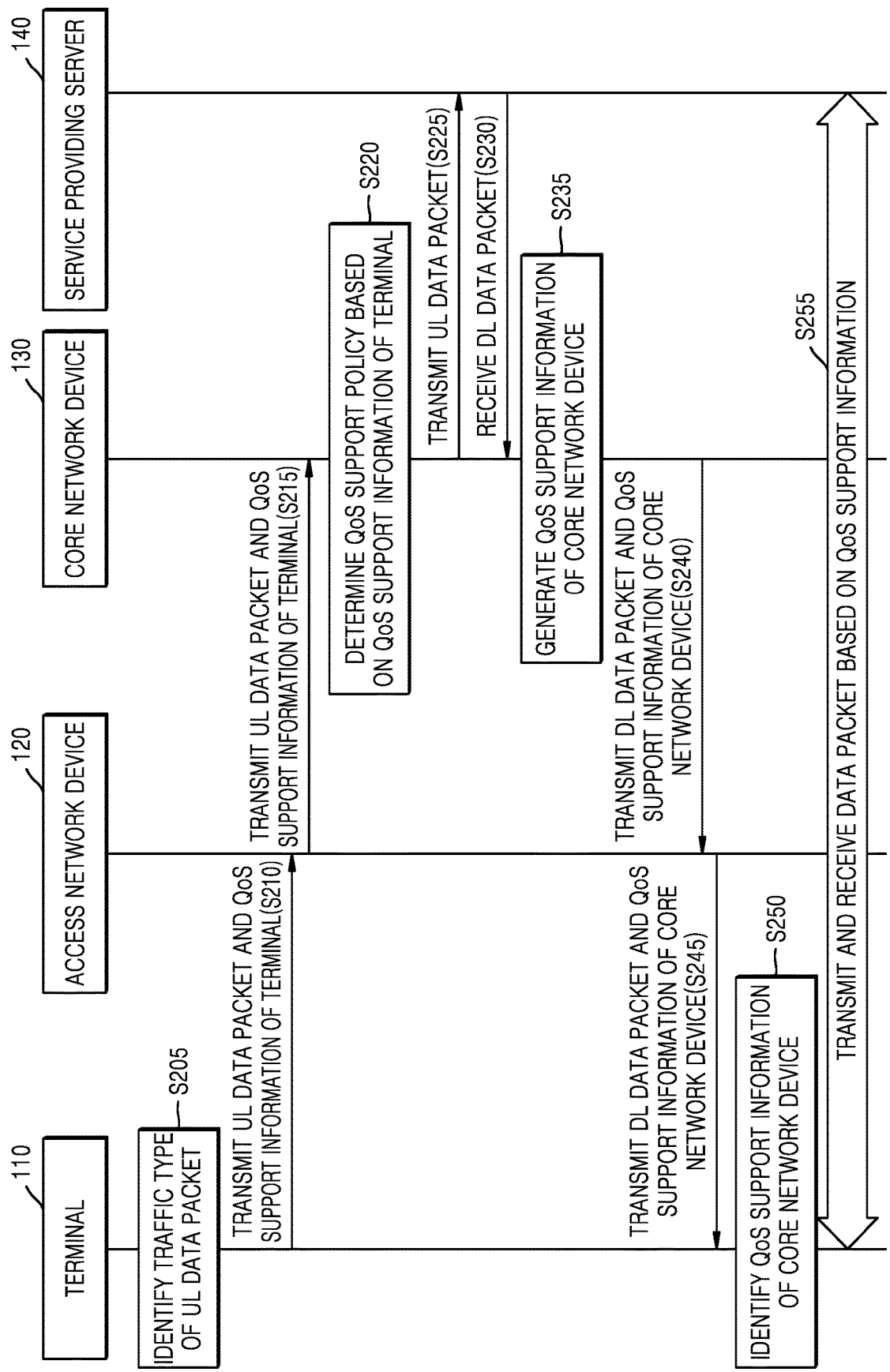
FIG. 2 is a flow diagram of a QoS information control method when a terminal and a core network device perform QoS control according to an embodiment of the disclosure.

FIG. 2 is a flow diagram of a QoS information control method when a terminal and a CN device perform QoS control according to an embodiment of the disclosure.

Referring to FIG. 2, in operation S205, the terminal 110 may identify a traffic type of a UL data packet. The traffic type may include information about a service type such as a video streaming service, a messenger service, and a video call service.

When the terminal 110 receives a DL data packet from the service providing server 140 before operation S210, the terminal 110 may identify a traffic type of the DL data packet instead of the UL data packet, and add the identified traffic type as QoS support information of the terminal 110 before transmission. A function of identifying the traffic type of the UL data packet, which will be described below, may be equally applied to the identification of the traffic type of the DL data packet received from the service providing server 140. However, for convenience, the function of identifying the traffic type of the UL data packet will be described as an example.

In operation S210, the terminal 110 may transmit the UL data packet and the QoS support information of the terminal 110 to the AN device 120 based on the identified traffic type.

When the traffic type is determined to be sensitive to a delay, the terminal 110 according to the embodiment may transmit the UL data packet and the QoS support information of the terminal 110 to the AN device 120. For example, the traffic type of the video streaming service and the video call service may be determined to be sensitive to the delay. Information about the QoS control or non-control corresponding to the traffic type may be prestored in the terminal 110.

In operation S215, the AN device 120 may transmit, to the CN device 130, a packet including the received UL data packet and QoS support information of the terminal 110.

When the AN device 120 does not perform the QoS control, the AN device 120 may not identify the QoS support information of the terminal 110. Accordingly, the AN device 120 may transmit, to the CN device 130, the UL data packet and the QoS support information of the terminal 110, which are received from the terminal 110.

In operation S220, the CN device 130 may determine a QoS support policy based on the received QoS support information of the terminal 110. For example, the CN device 130 may determine the QoS control or non-control based on the information about the traffic type included in the QoS support information.

In operation S225, the CN device 130 may transmit the UL data packet to the service providing server 140.

The CN device 130 may store the information about the UL data packet to determine whether the DL data packet provided from the service providing server 140 corresponds to the transmitted UL data packet.

In operation S230, the service providing server 140 may transmit the DL data packet corresponding to the UL data packet to the CN device 130.

In operation S235, when the DL data packet corresponding to the UL data packet is received from the service providing server 140, the CN device 130 may generate QoS support information of the CN device 130.

The CN device 130 may confirm that the received DL data packet is a packet corresponding to the transmitted UL data packet, based on the prestored information about the UL data packet.

In addition, the CN device 130 may generate the QoS support information based on the QoS support policy. For example, when using the QoS support policy based on QoS marking, the CN device 130 may include the QoS support information in the header of the UL data packet. In another example, in the case of using the QoS support policy based on packet filtering, the CN device 130 may generate the QoS support information separately from the UL data packet.

In operation S240, the CN device 130 may transmit the DL data packet and the QoS support information of the CN device 130 to the AN device 120.

In operation S245, the AN device 120 may transmit, to the terminal 110, the DL data packet and the QoS support information of the CN device 130, which are received from the CN device 130.

When the AN device 120 according to the embodiment does not perform the QoS control, the AN device 120 may not identify the QoS support information of the CN device 130. Therefore, the AN device 120 may transmit, to the terminal 110, the DL data packet and the QoS support information of the CN device 130, which are received from the CN device 130.

In operation S250, the terminal 110 may identify the QoS support information of the CN device 130. Therefore, the terminal 110 may identify the information about the QoS support policy and the QoS control interval of the CN device 130.

It can be seen that, when the terminal 110 receives only the QoS support information of the CN device 130 from the AN device 120, only the CN device 130 performs the QoS control. In addition, it may be identified through the QoS support information whether the QoS support policy of the CN device 130 is based on the QoS marking or the packet filtering.

In operation S255, the data packet may be transmitted and received based on the QoS support information.

For example, when the CN device 130 uses the QoS support policy based on the packet filtering, another UL data packet transmitted after the above-described UL data packet and another DL data packet transmitted after the above-described DL data packet may be transmitted without QoS support information.

In another example, when the CN device 130 uses the QoS support policy based on the QoS marking, another UL data packet and another DL data packet include QoS support information in the headers, and thus the UL data packet and the QoS support information may be transmitted together.

According to yet another example, even when the CN device 130 uses the QoS support policy based on the QoS marking, when the terminal 110 does not perform the QoS control with the user device, the CN device 130 may not include the QoS support information upon transmission of another DL data packet.

Figure 3:
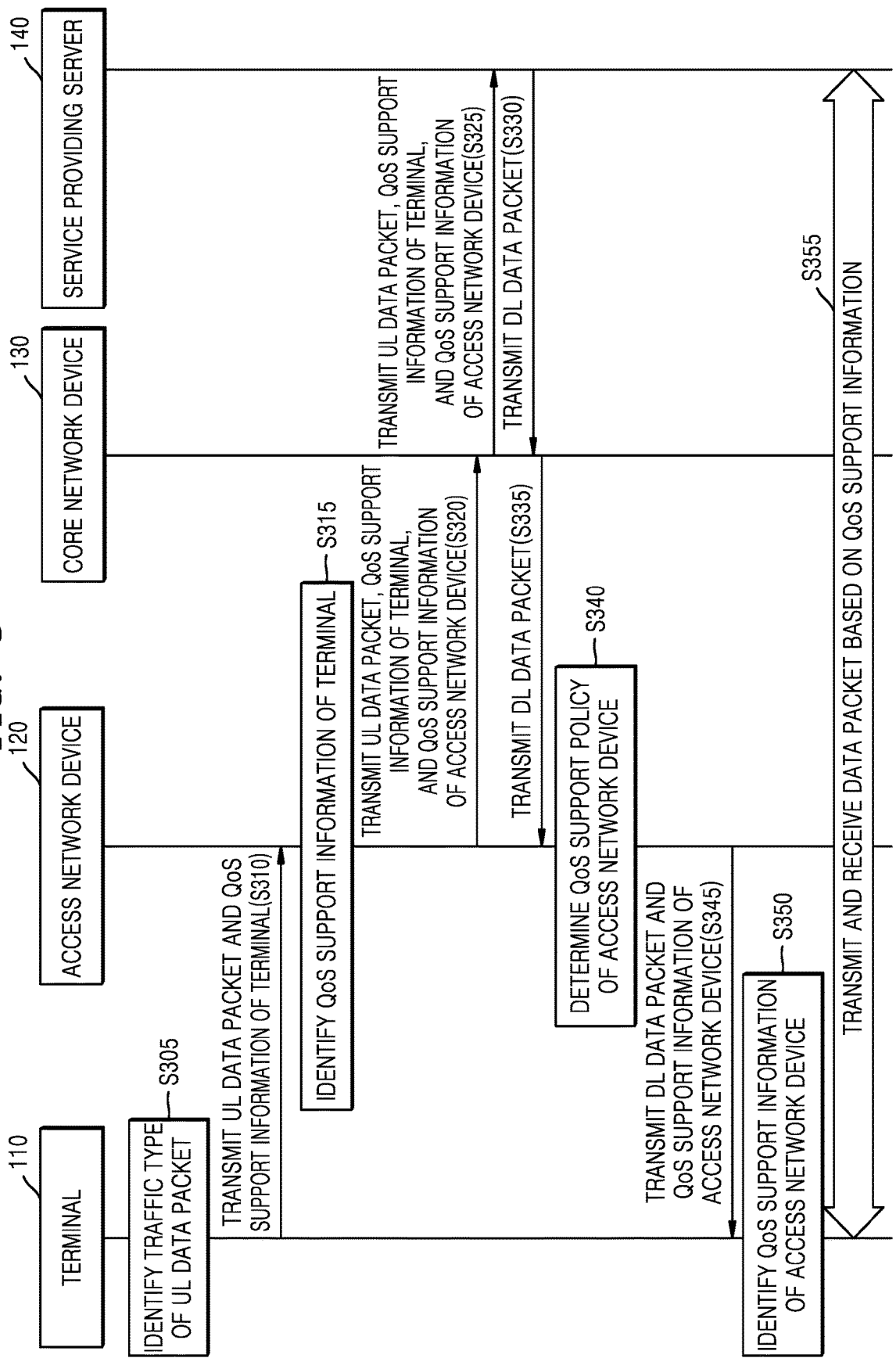
FIG. 3 is a flow diagram of a QoS information control method when a terminal and an access network device perform QoS control according to an embodiment of the disclosure.

FIG. 3 is a flow diagram of a QoS information control method when a terminal and an AN device perform QoS control according to an embodiment of the disclosure.

Referring to FIG. 3, in operation S305, the terminal 110 may identify a traffic type of a UL data packet. Operation S305 may correspond to operation S205 described above with reference to FIG. 2.

In operation S310, the terminal 110 may transmit the UL data packet and QoS support information of the terminal 110 to the AN device 120 based on the identified traffic type. Operation S310 may correspond to operation S210 described above with reference to FIG. 2.

In operation S315, the AN device 120 may identify the QoS support information of the terminal 110.

In addition, when the AN device 120 according to the embodiment receives the QoS support information of the terminal 110, the AN device 120 may install a packet filtering module for QoS control. When the packet filtering module identifies a DL data packet corresponding to the UL data packet of the terminal 110, the QoS control may be performed on the DL data packet identified by the AN device 120.

When the AN device 120 uses the QoS support policy based on the QoS marking, the packet filtering module may not be installed.

In operation S320, the AN device 120 may transmit the UL data packet, the QoS support information of the terminal 110, and the QoS support information of the AN device 120 to the CN device 130.

In operation S325, the CN device 130 may transmit, to the service providing server 140, the UL data packet, the QoS support information of the terminal 110, and the QoS support information of the AN device 120, which are received from the AN device 120.

When the CN device 130 according to the embodiment does not perform the QoS control, the CN device 130 may not identify the QoS support information of the terminal 110 and the AN device 120. Therefore, the CN device 130 may transmit, to the service providing server 140, the DL data packet, the QoS support information of the terminal 110, and the QoS support information of the AN device 120, which are received from the AN device 120.

According to another embodiment, the CN device 130 may ignore the QoS support information of the terminal 110 and the AN device 120, which cannot be identified, and transmit only the DL data packet to the service providing server 140.

In operation S330, the service providing server 140 may transmit the DL data packet corresponding to the UL data packet to the CN device 130. Operation S330 may correspond to operation S230 described above with reference to FIG. 2.

In operation S335, the CN device 130 may transmit the DL data packet received from the service providing server 140 to the AN device 120.

In operation S340, when the AN device 120 receives the DL data packet from the CN device 130, the QoS support policy of the AN device 120 may be determined.

The AN device 120 may identify that the received DL data packet is a packet subject to the QoS control, based on the packet filtering module installed in operation S315. In addition, when the AN device 120 receives only the DL data packet from the CN device 130, the AN device 120 may confirm that the CN device 130 does not support the QoS control. Therefore, the AN device 120 may maintain the existing QoS support policy.

In operation S345, the AN device 120 may transmit the DL data packet and the QoS support information of the AN device 120 to the terminal 110.

In operation S350, the terminal 110 may identify the QoS support information of the AN device 120.

It can be seen that, when the terminal 110 receives only the QoS support information of the AN device 120 from the AN device 120, only the AN device 120 performs the QoS control. In addition, the terminal 110 may identify the information about the QoS support policy and the QoS control interval through the QoS support information of the AN device 120.

In operation S355, the data packet may be transmitted and received based on the QoS support information.

For example, when the AN device 120 uses the QoS support policy based on the packet filtering, another UL data packet transmitted after the above-described UL data packet and another DL data packet transmitted after the above-described DL data packet may be transmitted without QoS support information.

In another example, when the AN device 120 uses the QoS support policy based on the QoS marking, another UL data packet and another DL data packet include QoS support information in the headers, and thus the UL data packet and the QoS support information may be transmitted together.

According to another example, even when the AN device 120 uses the QoS support policy based on the QoS marking, when it is determined that the terminal 110 does not perform the QoS control with the user device, the AN device 120 may not include the QoS support information upon transmission of another DL data packet.

Figure 4:
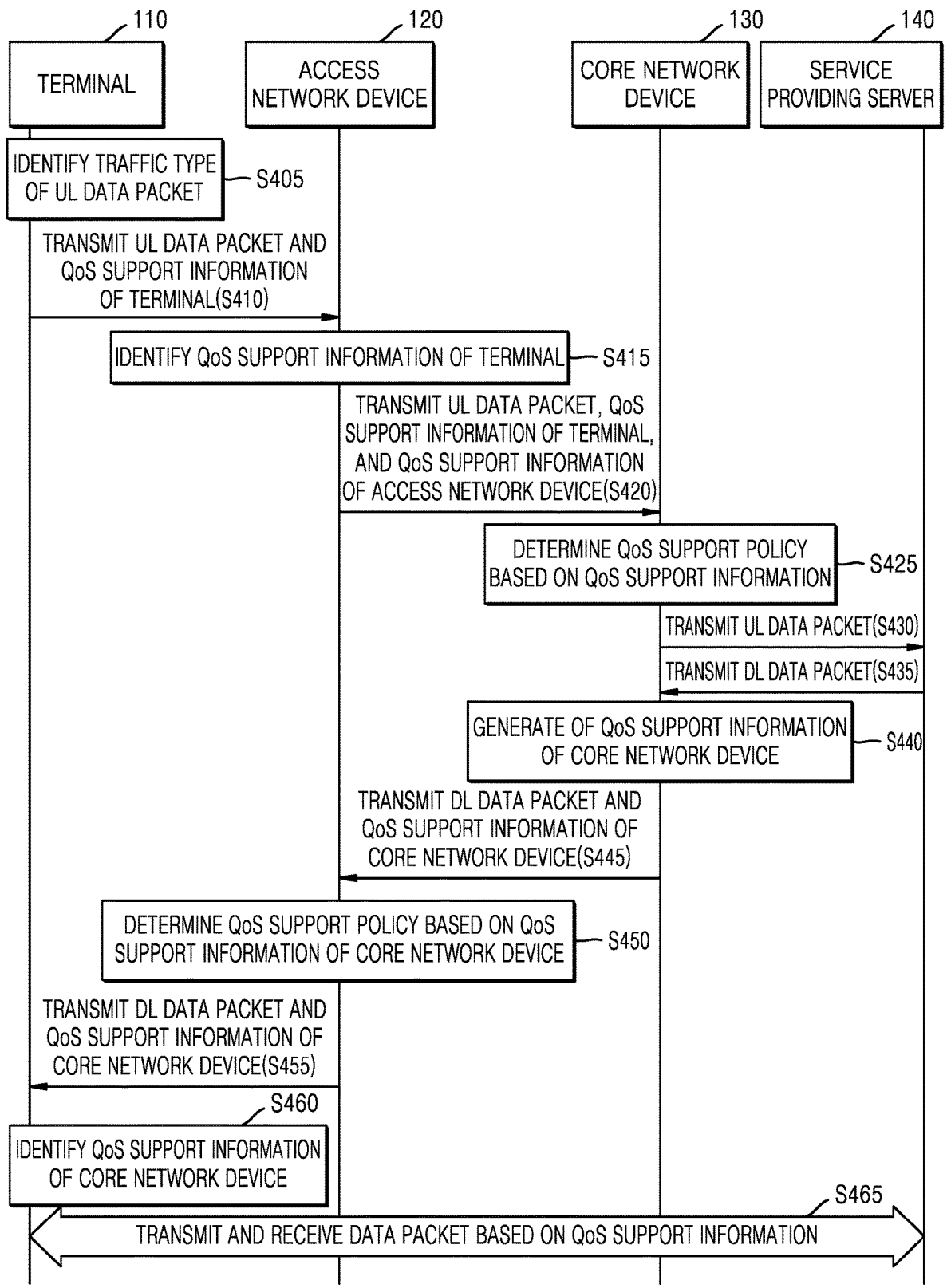
FIG. 4 is a flow diagram of a QoS information control method when a terminal, an access network device, and a core network device perform QoS control according to an embodiment of the disclosure.

FIG. 4 is a flow diagram of a QoS information control method when a terminal, an AN device, and a CN device perform QoS control according to an embodiment of the disclosure.

Referring to FIG. 4, in operation S405, the terminal 110 may identify a traffic type of a UL data packet. Operation S405 may correspond to operation S305 described above with reference to FIG. 3.

In operation S410, the terminal 110 may transmit the UL data packet and QoS support information of the terminal 110 to the AN device 120 based on the identified traffic type. Operation S410 may correspond to operation S310 described above with reference to FIG. 3.

In operation S415, the AN device 120 may identify the QoS support information of the terminal 110. Operation S415 may correspond to operation S315 described above with reference to FIG. 3.

In operation S420, the AN device 120 may transmit the UL data packet, the QoS support information of the terminal 110, and the QoS support information of the AN device 120 to the CN device 130.

In operation S425, the CN device 130 may determine a QoS support policy based on the received QoS support information of the terminal 110 and the AN device 120. For example, the CN device 130 may determine the QoS control or non-control based on the information about the traffic type included in the QoS support information.

In operation S430, the CN device 130 may transmit the UL data packet to the service providing server 140. Operation S430 may correspond to operation S225 described above with reference to FIG. 2.

In operation S435, the service providing server 140 may transmit the DL data packet corresponding to the UL data packet to the CN device 130. Operation S435 may correspond to operation S230 described above with reference to FIG. 2.

In operation S440, when the DL data packet corresponding to the UL data packet is received from the service providing server 140, the CN device 130 may generate QoS support information of the CN device 130. Operation S440 may correspond to operation S235 described above with reference to FIG. 2.

In operation S445, the CN device 130 may transmit the DL data packet and the QoS support information of the CN device 130 to the AN device 120.

In operation S450, the AN device 120 may determine a QoS support policy based on the received QoS support information of the CN device 130.

The AN device 120 according to the embodiment may determine the QoS support policy equally to the QoS support policy of the CN device 130.

For example, when the AN device 120 uses the QoS support policy based on the packet filtering and the CN device 130 uses the QoS support policy based on the QoS marking, the AN device 120 may change the QoS support policy based on the packet filtering to the QoS support policy based on the QoS marking. Therefore, the AN device 120 may remove the packet filtering module installed for using the QoS support policy based on the packet filtering.

In operation S455, the AN device 120 may transmit the DL data packet and the QoS support information of the CN device 130 to the terminal 110.

In operation S460, the terminal 110 may identify the QoS support information of the CN device 130.

In operation S465, the data packet may be transmitted and received based on the QoS support information.

For example, when the CN device 130 uses the QoS support policy based on the packet filtering, another UL data packet transmitted after the above-described UL data packet and another DL data packet transmitted after the above-described DL data packet may be transmitted without QoS support information.

In another example, when the CN device 130 uses the QoS support policy based on the QoS marking, another UL data packet and another DL data packet include QoS support information in the headers, so that the UL data packet and the QoS support information may be transmitted together.

Figure 5:
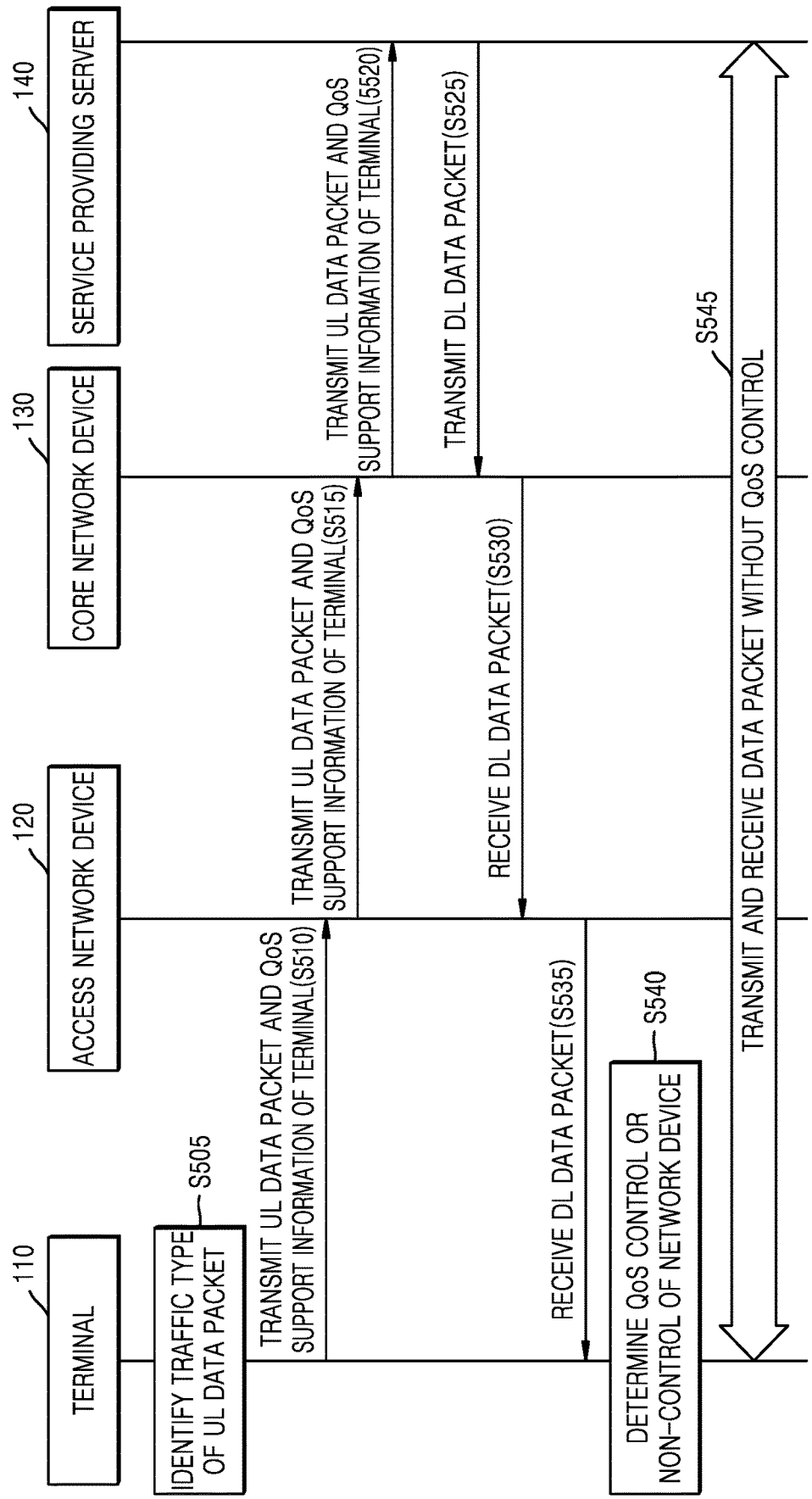
FIG. 5 is a flow diagram of a QoS information control method when a terminal performs QoS control according to an embodiment of the disclosure.

FIG. 5 is a flow diagram of a QoS information control method when a terminal performs QoS control according to an embodiment of the disclosure.

Referring to FIG. 5, in operation S505, the terminal 110 may identify a traffic type of a UL data packet. Operation S505 may correspond to operation S205 described above with reference to FIG. 2.

In operation S510, the terminal 110 may transmit the UL data packet and QoS support information of the terminal 110 to the AN device 120 based on the identified traffic type.

In operation S515, the AN device 120 may transmit the received UL data packet and QoS support information of the terminal 110.

When the AN device 120 according to the embodiment does not perform the QoS control, the AN device 120 may not identify the QoS support information of the terminal 110. Accordingly, the AN device 120 may transmit, to the CN device 130, the UL data packet and the QoS support information of the terminal 110, which are received from the terminal 110.

In operation S520, the CN device 130 may transmit the UL data packet and the QoS support information of the terminal 110 to the service providing server 140.

When the CN device 130 according to the embodiment does not perform the QoS control, the CN device 130 may not identify the QoS support information of the terminal 110. Therefore, the CN device 130 may transmit the DL data packet and the QoS support information of the terminal 110, which are received from the AN device 120.

According to another embodiment, the CN device 130 may ignore the QoS support information of the terminal 110, which cannot be identified, and transmit only the DL data packet to the service providing server 140.

In operation S525, the service providing server 140 may transmit the DL data packet corresponding to the UL data packet to the CN device 130.

In operation S530, the CN device 130 may transmit the DL data packet received from the service providing server 140 to the AN device 120.

In operation S535, the AN device 120 may transmit the DL data packet received from the CN device 130 to the terminal 110.

In operation S540, the terminal 110 may determine the QoS control or non-control of the CN device 130 and the AN device 120.

When the terminal 110 does not receive the QoS support information of the network device, the terminal 110 may determine that the network device does not perform the QoS control.

In operation S545, the data packet may be transmitted and received without QoS control.

Figure 6:
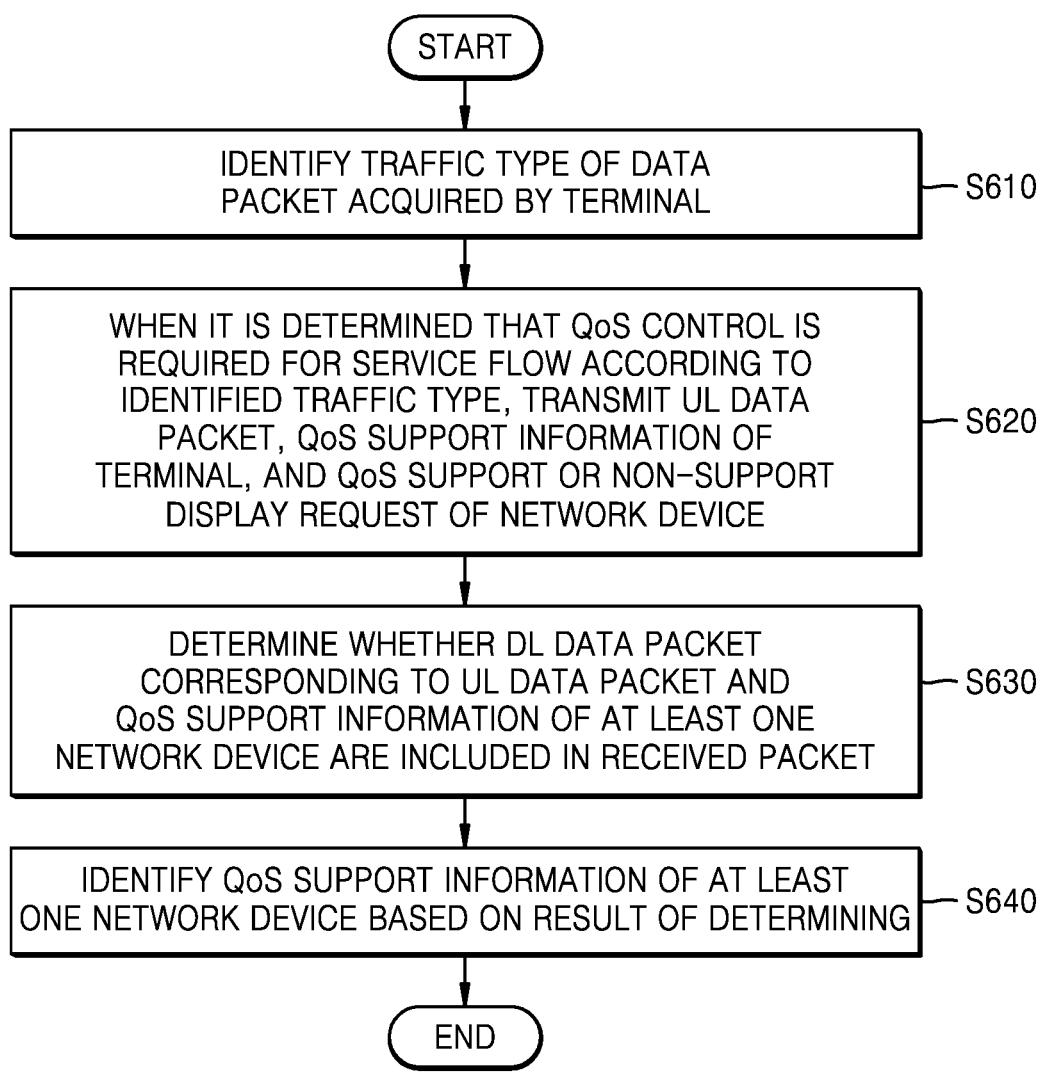
FIG. 6 is a flowchart of a method by which a terminal controls QoS information according to an embodiment of the disclosure.

FIG. 6 is a flowchart of a method by which a terminal controls QoS information according to an embodiment of the disclosure.

Referring to FIG. 6, in operation S610, the terminal 110 may identify a traffic type of a data packet acquired by the terminal 110. The acquired data packet may be a DL data packet received from the service providing server 140, or may be a UL data packet generated by the terminal 110 or the user device connected to the terminal 110.

In operation S620, when the terminal 110 determines that the QoS control is required for the service flow according to the identified traffic type, the terminal 110 may transmit the UL data packet, the QoS support information of the terminal 110, and the QoS support or non-support display request of the network device to the AN device 120.

For example, when the traffic type is determined to be sensitive to a delay, the terminal 110 may transmit the UL data packet and the QoS support information of the terminal 110 to the AN device 120.

The QoS support or non-support display request of the network device may be included in the QoS support information of the terminal 110 and transmitted to the AN device 120, or may be transmitted to the AN device 120 in the form independent of the QoS support information of the terminal 110.

In operation S630, the terminal 110 may determine whether the DL data packet corresponding to the UL data packet and the QoS support information of at least one network device are included in the packet received from the AN device 120. The at least one network device may refer to a network device which connects the terminal 110 and the service providing server 140 that provides the DL data packet corresponding to the UL data packet.

In operation S640, the terminal 110 may identify the QoS support information of the at least one network device based on a result of the determining.

The terminal 110 according to the embodiment may identify whether the QoS control is performed in the at least one network device and the QoS support policy of the at least one network device, based on the QoS support information of the at least one network device. For example, the terminal 110 may determine whether the QoS support policy of the at least one network device is the QoS support policy based on the packet filtering or the QoS support policy based on the QoS marking.

When the receive QoS support information is not present, the terminal 110 may determine that the network device performing the QoS control is not present.

Upon transmission of another UL data packet after the initially transmitted UL data packet, the terminal 110 may determine whether to transmit the QoS support information, based on a result of the identifying. For example, when the network device using the QoS support policy based on the QoS marking is present among the at least one network device, the terminal 110 may include the QoS support information in the header upon transmission of another UL data packet. In another example, when the network device using the QoS support policy based on the QoS marking is present among the at least one network device, the terminal 110 may transmit another UL data packet without including QoS support information.

Figure 7:
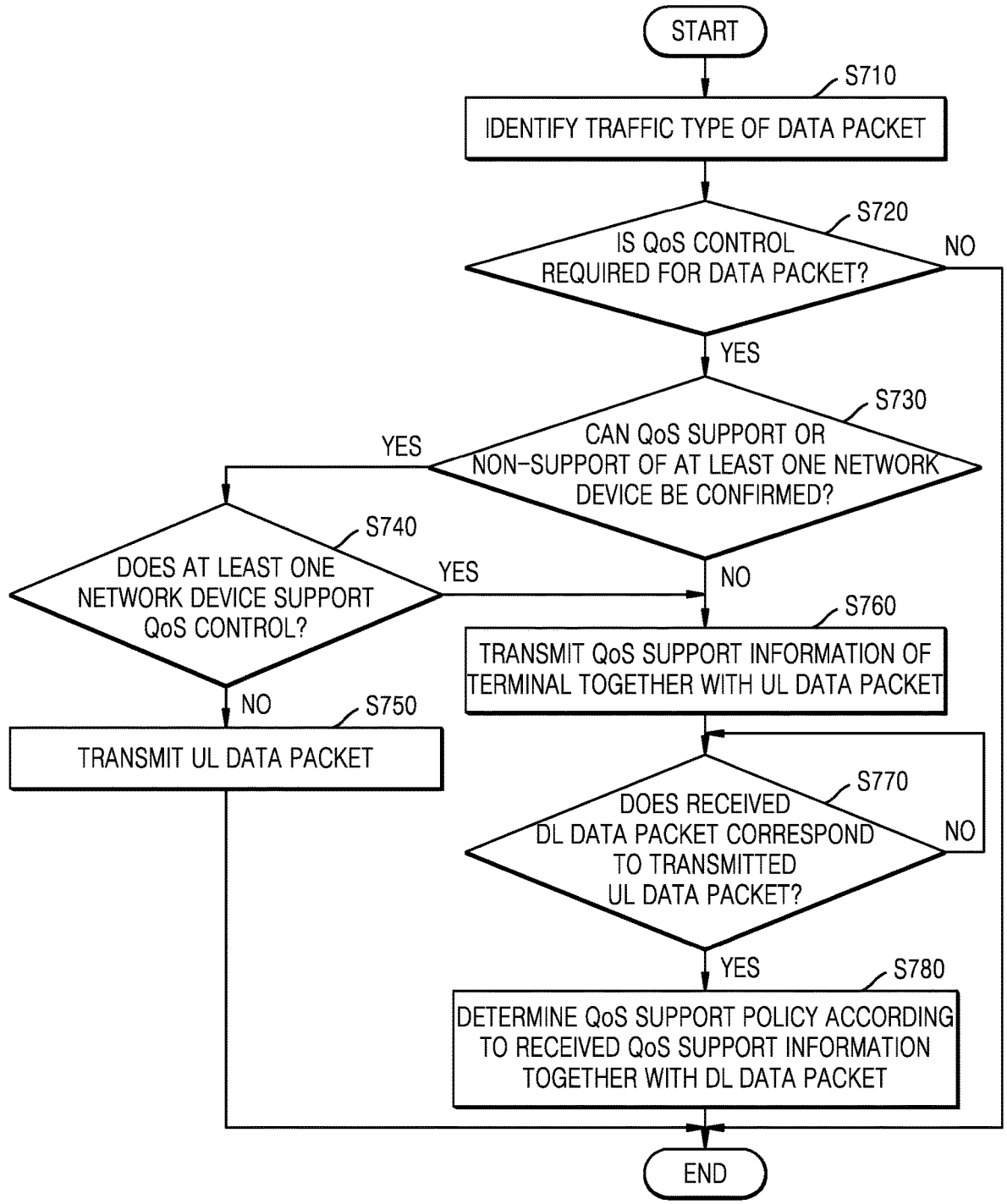
FIG. 7 is a flowchart of a method by which a terminal controls QoS information according to an embodiment of the disclosure.

FIG. 7 is a flowchart of a method by which a terminal controls QoS information according to an embodiment of the disclosure.

Referring to FIG. 7, in operation S710, the terminal 110 may identify a traffic type of a packet.

In operation S720, the terminal 110 may determine whether QoS control is required for the data packet according to the traffic type of the packet. For example, as a result of identifying the traffic type of the UL data packet, when the identified traffic type is sensitive to a delay or the like, the terminal 110 may determine that the QoS control is required.

In operation S730, when the terminal 110 determines that the QoS control is required for the UL data packet, the terminal 110 may determine whether the QoS control support or non-support of at least one network device can be confirmed.

In operation S740, when the QoS control support or non-support of the at least one network device can be confirmed, the terminal 110 may determine whether the at least one network device supports the QoS control.

In operation S750, when the at least one network device does not support the QoS control, the terminal 110 may transmit the UL data packet to the AN device 120. The terminal 110 may transmit only the UL data packet to the AN device 120 without the QoS support information of the terminal 110.

In operation S760, the terminal 110 may transmit the QoS support information of the terminal 110 to the AN device 120 together with the UL data packet.

For example, when it is determined in operation S730 that the QoS control support or non-support of the at least one network device cannot be confirmed, or when it is determined in operation S740 that the at least one network device supports the QoS control, the terminal 110 may transmit the QoS support information of the terminal 110 to the AN device 120 together with the UL data packet.

In operation S770, the terminal 110 may determine whether the DL data packet received from the AN device 120 corresponds to the transmitted UL data packet.

In operation S780, when the received DL data packet corresponds to the transmitted UL data packet, the terminal 110 may determine the QoS support policy according to the received QoS support information together with the DL data packet.

For example, when the at least one network device using the QoS support policy based on the QoS marking is present, the terminal 110 may include the QoS marking in the header of another UL data packet after the initially transmitted UL data packet and transmit the UL data packet. In another example, when the at least one network device using the QoS support policy based on the QoS marking is not present, the terminal 110 may transmit only another UL data packet after the initially transmitted UL data packet.

In another example, when the QoS support information is not received, the terminal 110 may determine that the network device supporting the QoS control is not present and may transmit only another UL data packet after the initially transmitted UL data packet.

Figure 8:
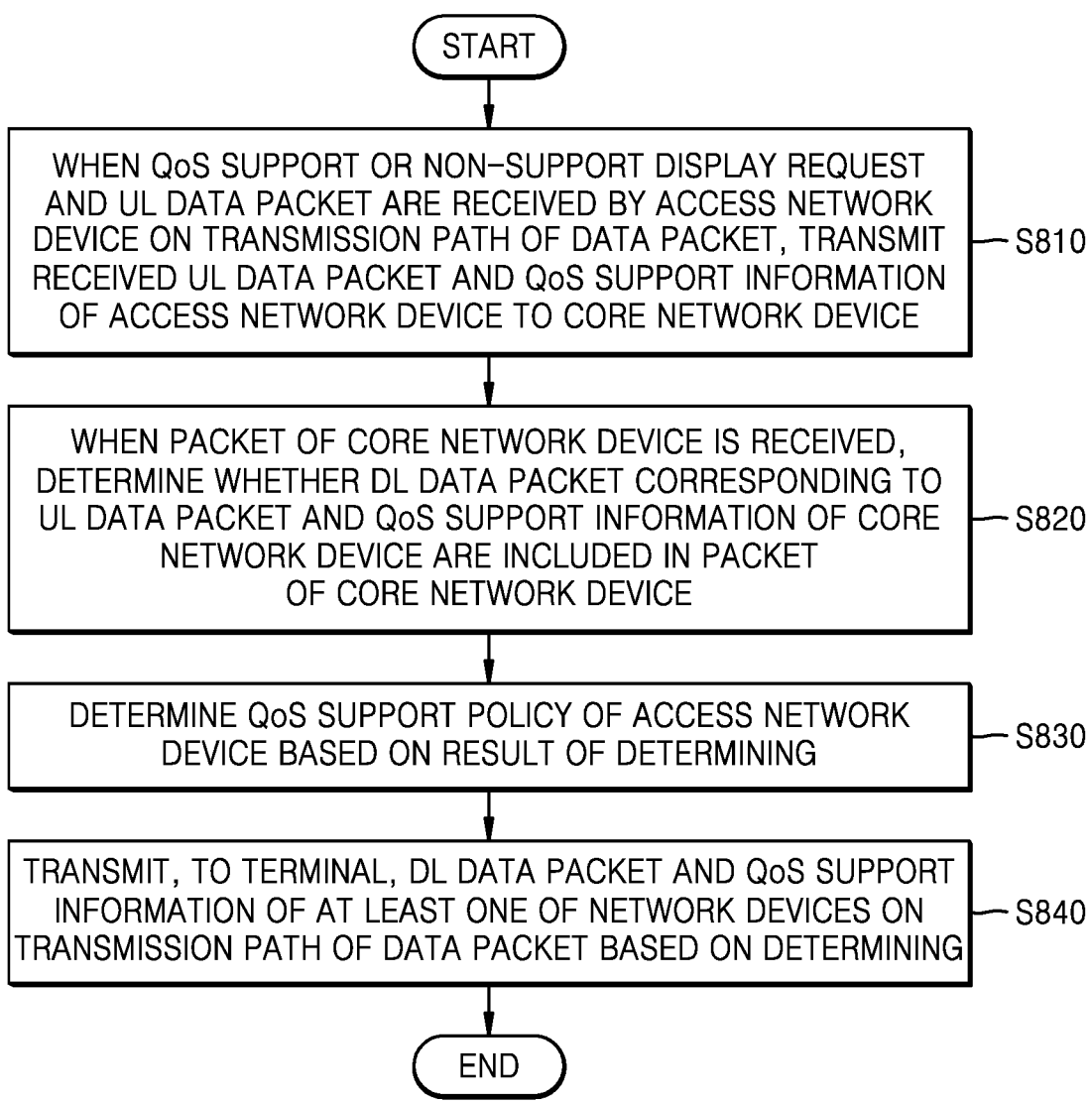
FIG. 8 is a flowchart of a method by which an access network device controls QoS information according to an embodiment of the disclosure.

FIG. 8 is a flowchart of a method by which an AN device controls QoS information according to an embodiment of the disclosure.

Referring to FIG. 8, in operation S810, when the AN device 120 receives a QoS support or non-support display request and a UL data packet, the AN device 120 may transmit the received UL data packet and QoS support information of the AN device 120 to the CN device 130.

In this example, it is assumed that the AN device 120 supports the QoS control.

When the AN device 120 receives the QoS support information of the terminal 110, the AN device 120 may determine that the terminal 110 supports the QoS control. The AN device 120 may install a packet filtering module for QoS control, as described above with reference to FIG. 3.

In operation S820, when the AN device 120 receives the packet of the CN device 130, the AN device 120 may determine whether the DL data packet corresponding to the UL data packet and the QoS support information of the CN device 130 are included in the packet of the CN device 130.

In operation S830, the AN device 120 may determine a QoS support policy of the AN device 120 based on the determination result of the AN device 120.

When the AN device 120 receives the QoS support information of the CN device 130, the AN device 120 may change the QoS support policy of the AN device 120 according to the QoS support policy of the CN device 130.

In operation S840, the AN device 120 may transmit, to the terminal 110, the DL data packet and the QoS support information of at least one of the network devices on the transmission path of the data packet based on the determination.

For example, when the CN device 130 does not perform the QoS control, the AN device 120 may transmit the DL data packet and the QoS support information of the AN device 120 to the terminal 110. In another example, when the CN device 130 performs the QoS control, the AN device 120 may transmit the DL data packet and the QoS support information of the AN device 120 and the CN device 130 to the terminal 110.

Figure 9:
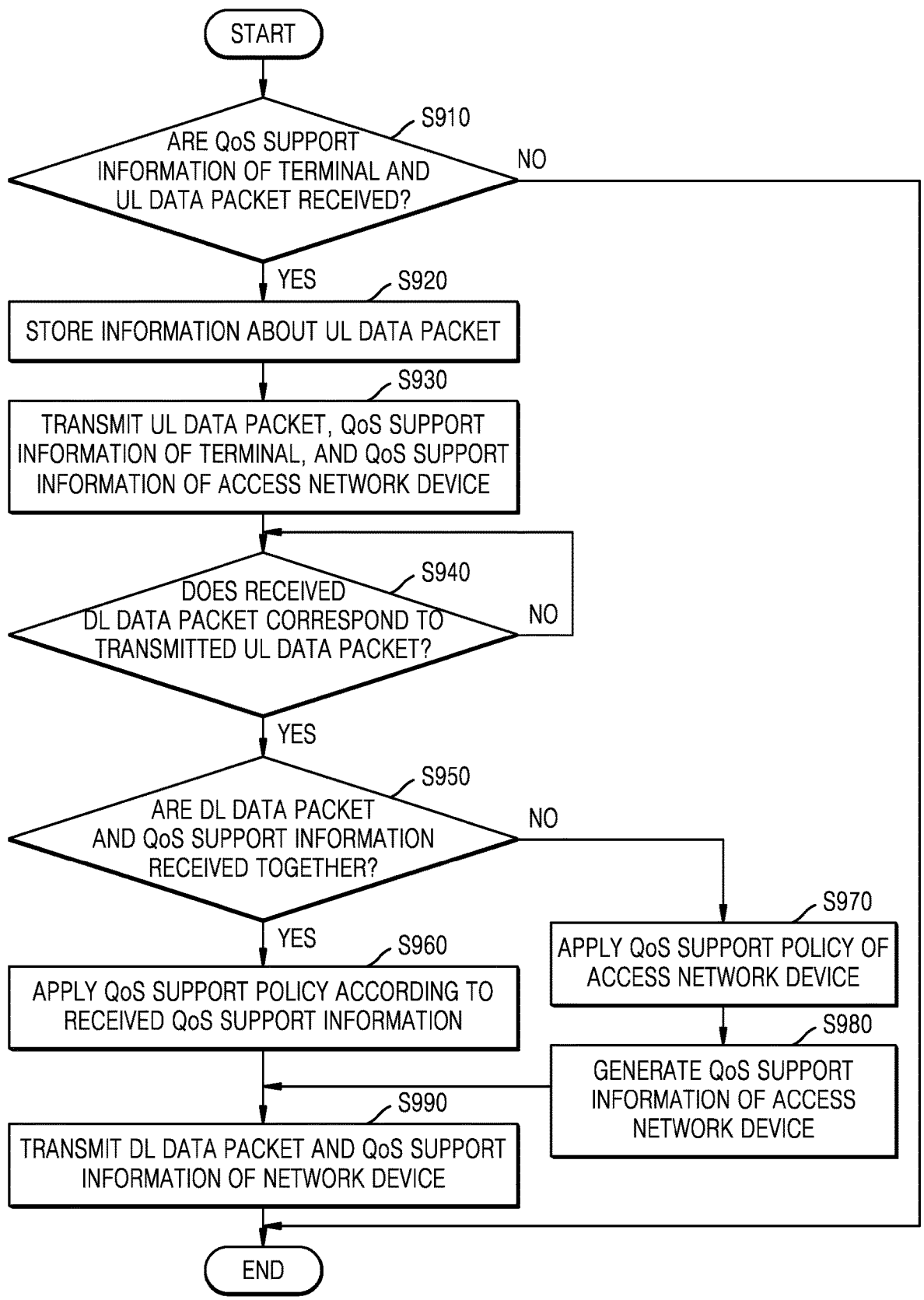
FIG. 9 is a flowchart of a method by which an access network device controls QoS information according to an embodiment of the disclosure.

FIG. 9 is a flowchart of a method by which an AN device controls QoS information according to an embodiment of the disclosure.

Referring to FIG. 9, n operation S910, the AN device 120 may determine whether QoS support information of the terminal 110 and a UL data packet are received.

In operation S920, when the QoS support information and the UL data packet are received, the AN device 120 may store information about the UL data packet.

In operation S930, the AN device 120 may transmit the UL data packet, the QoS support information of the terminal 110, and the QoS support information of the AN device 120 to the CN device 130.

In operation S940, the AN device 120 may determine whether the DL data packet received from the CN device 130 corresponds to the transmitted UL data packet.

In operation S950, when the received DL data packet corresponds to the transmitted UL data packet, the AN device 120 may determine whether the DL data packet and the QoS support information of the CN device 130 are received together.

In operation S960, when the QoS support information of the CN device 130 is received, the AN device 120 may apply the QoS support policy according to the received QoS support information of the CN device 130.

In operation S970, when the QoS support information of the CN device 130 is not received, the AN device 120 may apply the QoS support policy of the AN device 120.

In operation S980, the AN device 120 may generate the QoS support information of the AN device 120.

In operation S990, the AN device 120 may transmit the DL data packet and the QoS support information of the network device to the terminal 110.

For example, when the QoS support information of the CN device 130 is received, the AN device 120 may transmit the DL data packet and the received QoS support information of the CN device 130 to the terminal 110. In another example, when the QoS support information of the CN device 130 is not received, the AN device 120 may transmit the DL data packet and the QoS support information of the AN device 120 to the terminal 110.

Figure 10:
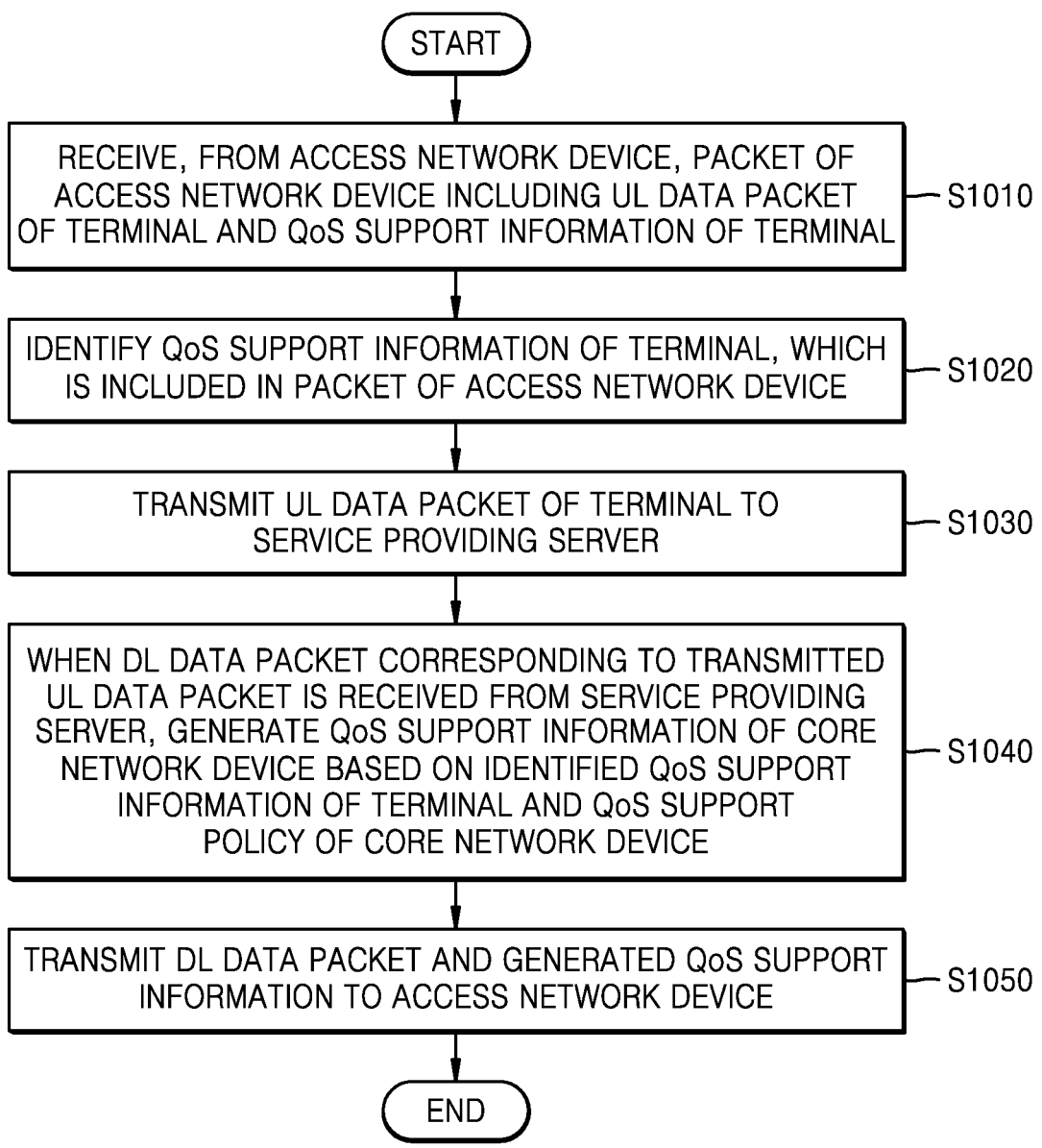
FIG. 10 is a flowchart of a method by which a core network device controls QoS information according to an embodiment of the disclosure.

FIG. 10 is a flowchart of a method by which a CN device controls QoS information according to an embodiment of the disclosure.

Referring to FIG. 10, in operation S1010, the CN device 130 may receive, from the AN device 120, a packet of the AN device 120 including a UL data packet of the terminal 110 and QoS support information of the terminal 110.

In operation S1020, the CN device 130 may identify the QoS support information of the terminal 110, which is included in the packet of the AN device 120. In addition to the QoS support information of the terminal 110, QoS support information of the AN device 120 may be further included in the packet of the AN device 120, which is received by the CN device 130.

In operation S1030, the CN device 130 may transmit the UL data packet of the terminal 110 to the service providing server 140.

In operation S1040, when the DL data packet corresponding to the transmitted UL data packet is received from the service providing server 140, the CN device 130 may generate QoS support information of the CN device 130 based on the identified QoS support information of the terminal 110 and the QoS support policy of the CN device 130.

In operation S1050, the CN device 130 may transmit the DL data packet and the generated QoS support information to the AN device 120.

Figure 11:
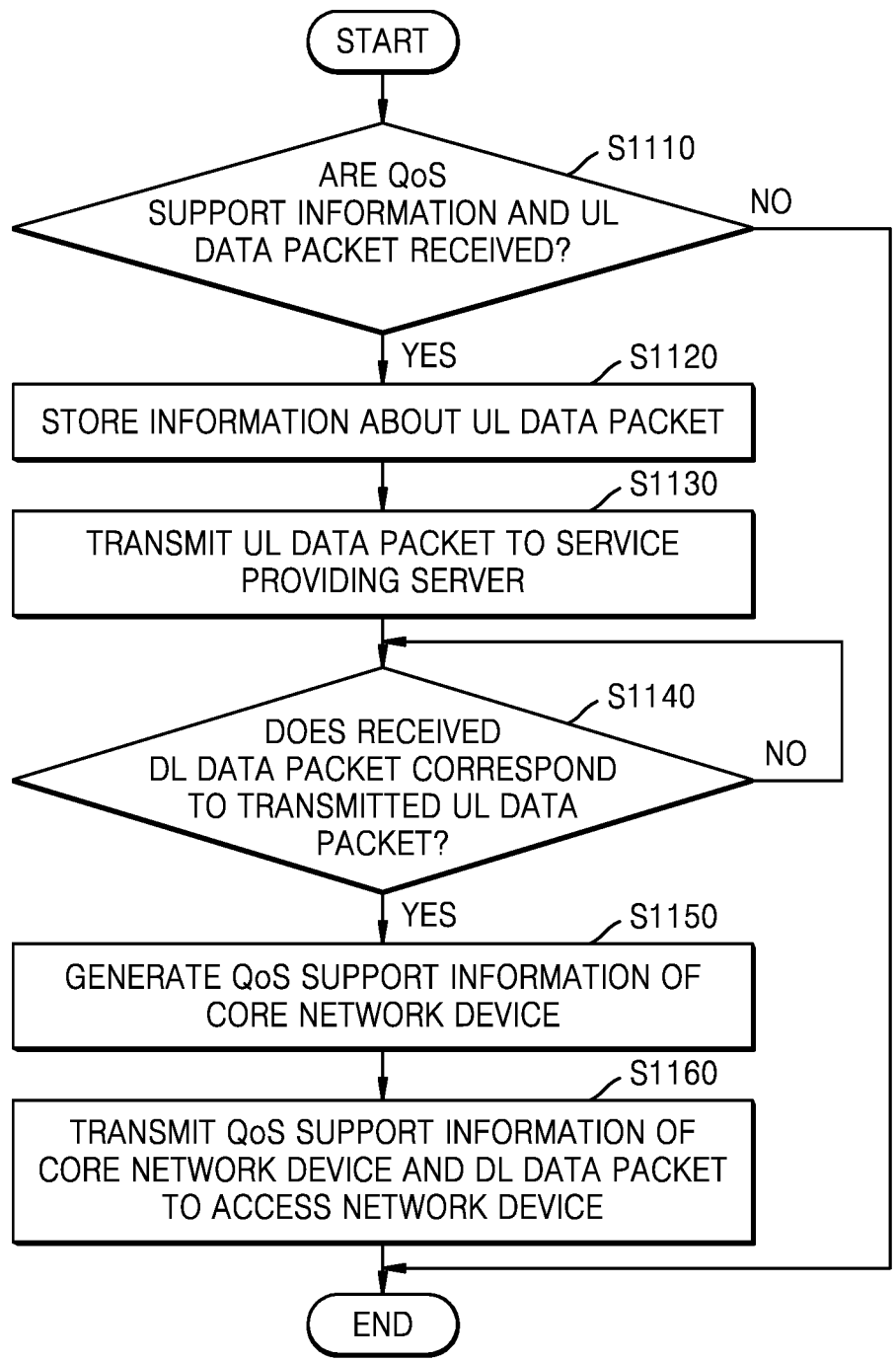
FIG. 11 is a flowchart of a method by which a core network device controls QoS information according to an embodiment of the disclosure.

FIG. 11 is a flowchart of a method by which a CN device controls QoS information according to an embodiment of the disclosure.

Referring to FIG. 11, in operation S1110, the CN device 130 may determine whether QoS support information and a UL data packet are received. The QoS support information may include QoS support information of the device that supports the QoS control in the terminal 110 and the AN device 120.

In operation S1120, the CN device 130 may store received information about the UL data packet. The stored information about the UL data packet may be used to determine whether the DL data packet received from the service providing server 140 corresponds to the UL data packet.

In operation S1130, the CN device 130 may transmit the UL data packet to the service providing server 140.

In operation S1140, the CN device 130 may determine whether the DL data packet received from the service providing server 140 corresponds to the transmitted UL data packet.

In operation S1150, when the received DL data packet corresponds to the transmitted UL data packet, the CN device 130 may generate QoS support information of the CN device 130.

In operation S1160, the CN device 130 may transmit the QoS support information of the CN device 130 and the DL data packet to the AN device 120.

Figure 12:
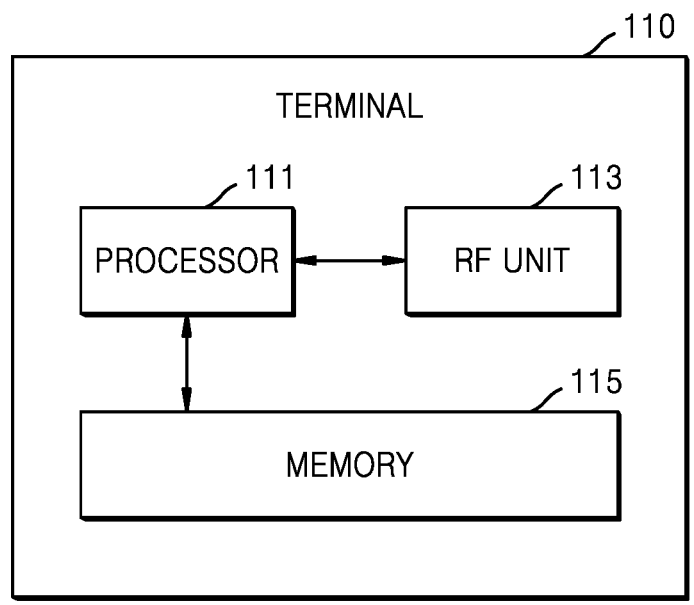
FIG. 12 is a block diagram of a terminal according to an embodiment of the disclosure.

FIG. 12 is a block diagram of a terminal according to an embodiment of the disclosure.

Referring to FIG. 12, the terminal 110 includes a processor 111, a radio frequency (RF) unit 113, and a memory 115.

The processor 111 implements the functions, processes, and/or methods proposed in the embodiments of FIGS. 1, 2, 3, 4, 5, 6, and 7. For example, the above-described operations of the terminal 110 may be implemented by the processor 111.

For example, the processor 111 may identify a traffic type of a UL data packet acquired by the terminal 110. When it is determined that the QoS control is required upon transmission of the UL data packet according to the identified traffic type, the processor 111 may control the RF unit 113 to transmit the UL data packet and the QoS support information of the terminal to the AN device 120. In addition, the processor 111 may determine whether the DL data packet corresponding to the UL data packet and the QoS support information of at least one network device are included in the packet received from the AN device 120. The processor 111 may identify the QoS support information of the at least one network device based on a result of the determining.

The RF unit 113 is connected to the processor 111 and transmits and/or receives a wireless signal corresponding to the packet (UL data packet, DL data packet, and QoS support information). The memory 115 is connected to the processor 111 and stores a protocol or parameters for operation.

Figure 13:
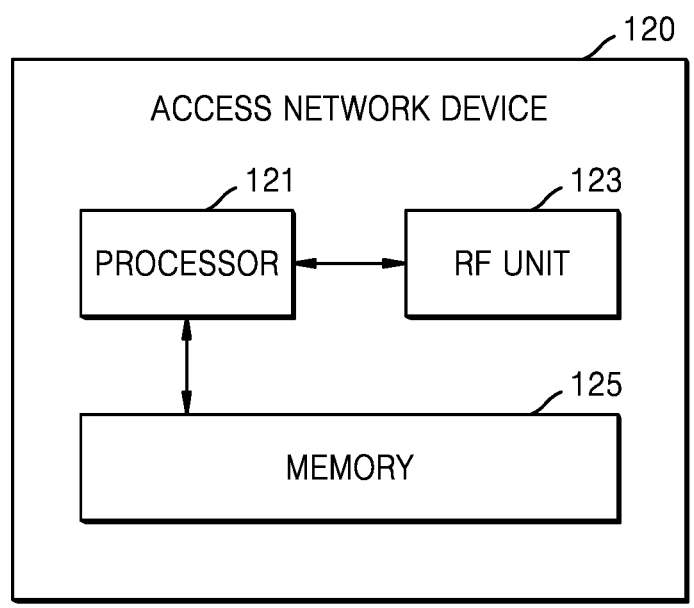
FIG. 13 is a block diagram of an access network device according to an embodiment of the disclosure.

FIG. 13 is a block diagram of an AN device according to an embodiment of the disclosure.

Referring to FIG. 13, the AN device 120 includes a processor 121, an RF unit 123, and a memory 125.

The processor 121 implements the functions, processes, and/or methods proposed in the embodiments of FIGS. 1, 2, 3, 4, 5, 8, and 9. The above-described operations of the AN device 120 may be implemented by the processor 121.

For example, when the AN device 120 receives the packet including the UL data packet of the terminal 110 and the QoS support information of the terminal, the processor 121 may control the RF unit 123 to transmit the received packet and the QoS support information of the AN device 120 to the CN device 130. In addition, when the packet of the CN device 130 is received, the processor 121 may determine whether the DL data packet corresponding to the UL data packet and the QoS support information of the CN device 130 are included in the packet of the CN device 130. The processor 121 may determine the QoS support policy of the AN device 120 based on a result of the determining. The processor 121 may control the RF unit 123 to transmit the DL data packet and the QoS support information of at least one of the AN device 120 and the CN device 130 to the terminal 110.

The RF unit 123 is connected to the processor 121 and transmits and/or receives a wireless signal corresponding to the packet (UL data packet, DL data packet, and QoS support information). The memory 125 is connected to the processor 121 and stores a protocol or parameters for operation.

Figure 14:
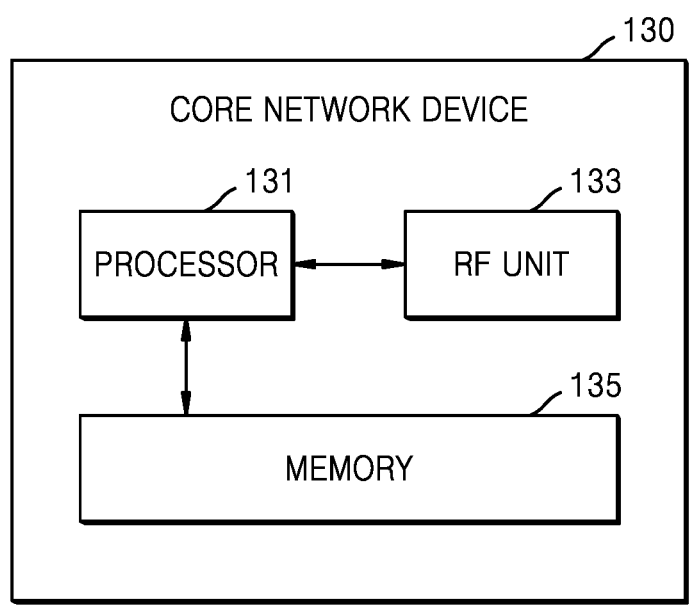
FIG. 14 is a block diagram of a core network device according to an embodiment of the disclosure.

FIG. 14 is a block diagram of a CN device according to an embodiment of the disclosure.

Referring to FIG. 14, the CN device 130 includes a processor 131, an RF unit 133, and a memory 135.

The processor 131 implements the functions, processes, and/or methods proposed in the embodiments of FIGS. 1, 2, 3, 4, 5, 10, and 11. The above-described operations of the CN device 130 may be implemented by the processor 131.

For example, the processor 131 may control the RF unit 133 to receive, from the AN device 120, the packet of the AN device 120 including the UL data packet of the terminal 110 and the QoS support information of the terminal 110. The processor 131 may identify the QoS support information of the terminal 110 included in the packet of the AN device 120. When the UL data packet of the terminal 110 is transmitted to the service providing server 140 and the DL data packet corresponding to the transmitted UL data packet is received from the service providing server 140, the processor 131 may control the RF unit 133 to transmit, to the AN device 120, the DL data packet and the QoS support information of the CN device 130 generated based on the identified QoS support information of the terminal and the QoS support policy of the CN device 130.

The RF unit 133 is connected to the processor 131 and transmits and/or receives a wireless signal corresponding to the packet (UL data packet, DL data packet, and QoS support information). The memory 135 is connected to the processor 131 and stores a protocol or parameters for operation.

The processor may include an application-specific integrated circuit (ASIC), other chipsets, logic circuits, and/or data processors. Examples of the memory may include read-only memory (ROM), random access memory (RAM), flash memory, memory card, storage medium, and/or other storage devices. The RF unit may include a baseband circuit configured to process a wireless signal. When the embodiment is implemented in software, the above-described technique may be implemented with a module (process, function, etc.) that performs the above-described function. The module may be stored in the memory and may be executed by the processor. The memory may be provided inside or outside the processor, and may be connected to the processor by well-known various methods.

In the above systems, although the methods have been described on the basis of the flowcharts using a series of the steps or blocks, the disclosure is not limited to the sequence of the operations, and some of the operations may be performed at different sequences from the remaining operations or may be performed simultaneously with the remaining operations. Furthermore, those of ordinary skill in the art will understand that the operations shown in the flowcharts are not exclusive and may include other operations or one or more operations of the flowcharts may be deleted without affecting the scope of the disclosure.

All documents cited in the disclosure, including published documents, patent applications, and patents, may be incorporated herein in their entirety by reference in the same manner as when each cited document is separately and specifically incorporated or incorporated in its entirety.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to those of ordinary skill in the art.

The disclosure may be described in terms of functional block components and various processing operations. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure could employ any number of existing techniques for electronics configuration, signal processing and/or control, data processing and the like. The terms "mechanism" and "element" are used in a broad sense and are not limited to mechanical or physical embodiments, but may include software routines in conjunction with processors, or the like.

The particular implementations shown and described herein are illustrative examples of the disclosure and are not intended to otherwise limit the scope of the disclosure in any way. For the sake of brevity, existing electronics, control systems, software, and other functional aspects of the systems may not be described in detail. Furthermore, the connecting lines or connecting members shown in the various figures are intended to represent functional relationships and/or physical or logical connections between the various elements. It should be noted that many alternative or additional functional relationships, physical connections or logical connections may be present in a practical apparatus. Moreover, no component is essential to the practice of the embodiments unless the element is specifically described as "essential" or "critical".

It should be understood that embodiments described herein should be considered in a descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal for controlling quality of service (QoS) information, the method comprising:
    obtaining an uplink (UL) data packet;
    identifying a traffic type of the UL data packet;
    in case that QoS control is required for a service flow based on the traffic type, transmitting, to a network device, the uplink (UL) data packet, and first QoS support information, wherein the first QoS support information includes a QoS support policy of the terminal and a request to indicate whether a QoS control is supported at the network device;
    receiving at least one packet from the network device;
    in case that a downlink (DL) data packet included in the at least one packet corresponds to the UL data packet, identifying at least one second QoS support information of the network device or an other network device included in the at least one packet; and
    performing transmission or reception of at least one data packet based on the at least one second QoS support information.

2. The method of claim 1, further comprising:
    determining, using the second QoS support information, whether a QoS support policy of the network device or the other network device is based on packet filtering or based on a QoS marking.

3. The method of claim 1, further comprising, in case that the second QoS support information is not included in the received packet, transmitting, to the network device, only at least one other UL data packet and the first QoS support information,
    wherein the at least one other UL data packet is transmitted in a subsequent order after the UL data packet.

4. A non-transitory computer-readable recording medium having recorded thereon a program for performing the method of claim 1 on at least one processor.

5. A method of a first network device for controlling quality of service (QoS) information, the method comprising:
    in case that an uplink (UL) data packet is received with first QoS support information from a terminal, transmitting the received UL data packet, the received first QoS support information and second QoS support information of the first network device to a second network device, wherein the first QoS support information includes a request to indicate whether a QoS control is supported at the network device and information regarding a traffic type of the UL data packet and a QoS support policy;
    receiving a packet from the second network device;
    in case that a downlink (DL) data packet corresponding to the UL data packet is included in the received packet, identifying third QoS support information of the second network device are included in the received packet;
    determining a QoS support policy of the first network device based on a result of the identifying; and
    transmitting, to the terminal, the DL data packet, the second QoS support information and the third QoS support information based on the determined QoS support policy.

6. The method of claim 5, further comprising:
    in case that the first QoS support information is received from the terminal, installing a packet filtering module for QoS support.

7. The method of claim 5, wherein the transmitting of the DL data packet comprises, in case that QoS support information of network devices other than the first network device in the transmission path of the data packet is not included in the packet of the second network device, transmitting the first QoS support information and the DL data packet to the terminal.

8. The method of claim 5, further comprising, in case that the QoS support policy of the network device is based on packet filtering, transmitting only another data packet in a subsequent order of the UL data packet or the DL data packet.

9. The method of claim 5, further comprising, in case that QoS control is not performed at the terminal transmitting only another DL data packet in a subsequent order of the DL data packet.

10. A terminal for controlling quality of service (QoS) information, the terminal comprising:
    a transceiver;
    at least one processor configured to:
        obtain an uplink (UL) data packet,
        identify a traffic type of the UL data packet,
        in case that QoS control is required for a service flow based on the traffic type, control the transceiver to transmit, to a network device, the UL data packet, and first QoS support information, wherein the first QoS support information includes a QoS support policy of the terminal and a request to indicate whether a QoS control is supported at the network device,
        control the transceiver to receive at least one packet from the network device,
        in case that a downlink (DL) data packet included in the at least one packet corresponds to the UL data packet, identify at least one second QoS support information of the network device or an other network device included in the at least one packet, and
        perform transmission or reception of at least one data packet based on the at least one second QoS support information.

11. The terminal of claim 10, wherein the at least one processor is further configured to determine, using the second QoS support information, whether a QoS support policy of the network device or the other network device is based on packet filtering or based on QoS marking.

12. The terminal of claim 10,
    wherein the at least one processor is further configured to, in case that the second QoS support information is not included in the received packet, transmit, to the network device, only at least one other UL data packet and the first QoS support information, and
    wherein the at least one other UL data packet is transmitted in a subsequent order after the UL data packet.

13. A first network device for controlling quality of service (QoS) information, the first network device comprising:
    a transceiver;
    at least one processor configured to:
        in case that an uplink (UL) data packet is received with first QoS support information from a terminal, control the transceiver to transmit the received UL data packet, the received first QoS support information and second QoS support information of the first network device to a second network device, wherein the first QoS support information includes a request to indicate whether a QoS control is supported at the network device and information regarding a traffic type of the UL data packet and a QoS support policy, control the transceiver to receive a packet from the second network device, in case that a downlink (DL) data packet corresponding to the UL data packet is included in the received packet, identify third QoS support information of the second network device are included in the received packet, determine a QoS support policy of the first network device based on a result of the identifying, and control the transceiver to transmit, to the terminal, the DL data packet, the second QoS support information and the third QoS support information based on the determined QoS support policy; and a memory storing information about the UL data packet.

14. The first network device of claim 13, wherein the at least one processor is further configured to:

in case that the first QoS support information is received from the terminal, install a packet filtering module for QoS support.

15. The first network device of claim 13, wherein the at least one processor is further configured to, in case that QoS support information of network devices other than the first network device in the transmission path of the data packet is not included in the packet of the second network device, control the transceiver to transmit the first QoS support information and the DL data packet to the terminal.

16. The first network device of claim 13, wherein the processor is further configured to, in case that the QoS support policy of the first network device is based on packet filtering, control the transceiver to transmit only another data packet in a subsequent order of the UL data packet or the DL data packet.

17. The first network device of claim 13, wherein the processor is further configured to, in case that QoS control is not performed at the terminal, control the transceiver to transmit only another DL data packet in a subsequent order of the DL data packet.

* * * * *